United States Patent [19]

Bertrand

[11] 4,092,281

[45] May 30, 1978

[54] FIRE RETARDANT POLYSTYRENIC COMPOSITIONS

[75] Inventor: Jean-Noel Marie Bertrand, Tervueren, Belgium

[73] Assignee: Labofina S. A., Brussels, Belgium

[21] Appl. No.: 594,219

[22] Filed: Jul. 9, 1976

[30] Foreign Application Priority Data

Jul. 12, 1974   Belgium .................................. 146536

[51] Int. Cl.$^2$ ........................... C08K 5/03; C08K 5/20
[52] U.S. Cl. ........................... 260/23 H; 260/32.6 R; 260/45.7 R; 260/45.7 P; 260/45.75 B; 260/45.95 G; 260/45.9 NC; 260/DIG. 19
[58] Field of Search ....... 260/45.9 NC, 23 H, 32.6 R, 260/DIG. 19, 45.7 RL, 45.7 P, 45.95 G, 45.75 B; 526/6, 492

[56] References Cited

U.S. PATENT DOCUMENTS

| | | | |
|---|---|---|---|
| 3,197,425 | 7/1965 | König et al. | 260/23 H |
| 3,455,873 | 7/1969 | Jenkner | 260/2.5 FP |
| 3,631,162 | 12/1971 | McGaugh et al. | 260/DIG. 19 |
| 3,637,552 | 1/1972 | Bryan | 26/DIG. 19 |
| 3,755,209 | 8/1973 | Nintz et al. | 260/45.9 AA |
| 3,911,047 | 10/1975 | Wolf et al. | 526/6 |
| 3,920,606 | 11/1975 | Diebel et al. | 260/45.7 |
| 3,962,164 | 6/1976 | Praetzel | 260/45.7 |
| 3,965,214 | 6/1976 | Nametz et al. | 260/45.7 |

*Primary Examiner*—V. P. Hoke

[57] ABSTRACT

An improved fire retardant polystyrenic composition comprising a polystyrenic resin, a fire retardant agent selected from the group consisting of halogenated and phosphorous-containing fire retardant agents and combinations thereof, antimony oxide and an aliphatic nitrogen-containing compound selected from the group consisting of amines, amides and ammonium compounds containing from 8 to 25 carbon atoms, mixtures thereof and the oxyalcoylated derivatives thereof.

21 Claims, No Drawings

FIRE RETARDANT POLYSTYRENIC COMPOSITIONS

BACKGROUND OF THE INVENTION

This invention relates to fire retardant polystyrenic compositions.

For many uses, fire retardant additives have been incorporated into polystyrenic compositions, such as polystyrene, acrylonitrile-butadiene-styrene copolymers (ABS resins), high-impact polystyrenes and the like, to impart fire resistance to such compositions. Organic compounds containing bromine and/or chlorine and/or phosphorous are employed frequently as fire retardant agents. Nitrogen compounds, such as bromoanilines, brominated diphenylamines and anilides, generally in admixture with chlorinated paraffins, have also been suggested as fire retardants.

The synergistic action of combinations of fire retardant additives has also been contemplated with a view toward decreasing the amount of fire retardant agent which is required to obtain polystyrenic compositions which fulfill specifications relating to combustion and flame propagation. Such combinations of additives are most often oxides or sulfides of heavy metals, more particularly antimony oxide, having a synergistic action with halogenated fire retardant agents. When used alone or in the absence of any halogenated fire retardant agent, antimony oxide has no fire retardant action.

An object of the present invention is to provide a new synergistic fire retardant additive combination for fire retardant compounds.

An additional object of the present invention is to provide a synergistic combination of additives for producing fire retardant polystyrenic compounds which generally are used in admixture with antimony oxide.

Another object of the present invention is to provide new and improved fire retardant and anti-static polystyrenic compositions.

SUMMARY OF THE INVENTION

According to the present invention, in one of its embodiments it is a polystyrenic composition comprising a styrenic polymer, a halogenated and/or phosphorous-containing fire retardant agent and a nitrogen-containing aliphatic compound selected from the group consisting of aliphatic amines, amides and aliphatic ammonium compounds and their oxyalcoylated derivatives containing 8 to 25 carbon atoms, said nitrogen-containing compound being used in an amount of between 0.2 and 8% by weight of styrenic polymer.

In another embodiment, the present invention is a fire retardant composition for use in combination with styrenic polymers, said fire retardant composition comprising a halogenated and/or phosphorous-containing fire retardant agent and a nitrogen-containing aliphatic compound selected from the group consisting of aliphatic amines, amides and aliphatic ammonium compounds and their oxyalcoylated derivatives containing 8 to 25 carbon atoms.

"Styrenic polymers" include styrene homopolymers, styrene based copolymers such as ABS and SAN, and high-impact polystyrenes containing an elastomer, like rubber, in an amount which may reach 15% by weight.

DESCRIPTION OF THE PREFERRED EMBODIMENTS

The flame retardant agent is a halogenated organic compound or a phosphorous-containing compound or a mixture thereof. The halogenated compounds are used in an amount such that the halogen content in the final styrenic polymer composition is between 2 and 15% by weight. When a phosphorous-containing compound is used, the amount of phosphorous present in the final styrenic polymer composition may vary between 0.5 and 5% by weight. The preferred fire retardant agents are compounds with a low volatility. By way of illustration and not of limitation, the preferred compounds include polyhalogenated biphenyls, polyhalogenated biphenylethers, perhalopentacyclododecane, tris(2,3-dibromopropyl)phosphate, and the like. The fire retardancy action of these agents can be enhanced by the use of antimony oxide which may be employed in an amount that generally does not exceed 7% by weight and which, more particularly, is between 1 and 4% by weight.

The nitrogen-containing compounds have a straight-chain radical containing from 8 to 25 carbon atoms and have a hydrophilic group. The most preferred hydrophilic groups are amines, amides and compounds containing an ammonium radical. These groups may be oxyalcoylated in order to improve the hydrophilic character. Generally, the oxyalcoylated derivatives contain an average of 2 to 6 oxyalcoylene groups. Additionally, these nitrogen-containing compounds may include a lipophilic group, which is preferably a saturated or unsaturated aliphatic carboxylic acid, such as pelargonic, caproic, lauric, octanoic, cetylic or stearic acid.

The nitrogen-containing compounds, as above defined, offer the added advantage that they impart anti-static properties to the polystyrenic compositions. The nitrogen-containing compounds which are commonly used are amines or amides, which are oxyalcoylated or not, and compounds containing an ammonium group. Typical compounds are lauric acid diethanolamide, ethoxylated cetylamine, pelargonic acid triisopropanolamide, and the like. These compounds are used in an amount which may vary between 0.2 and 8% by weight and more particularly, between 1 and 3% by weight of polymer.

It has been found that the amount of antimony oxide added to the polymer may be decreased by about 50% below that conventionally employed without detrimental effect on the fire retardant properties of the polymer when a nitrogen-containing compound such as those above described, is incorporated into the polystyrenic composition.

The following examples are provided to illustrate the features of the present invention and show the synergistic effect of the nitrogen-containing compounds on the fire retardant agents.

The self-extinguishing properties of the polystyrenic compositions were determined with the use of specimens of 15.23 × 1.27 × 0.32 cm, according to the following test:

Each specimen is hung, the larger dimension being vertical and the distance between the lower end of the specimen and the upper end of a burner being 0.95 cm. The burner is lighter and the flame has a height of 1.9 cm. Air is premixed with the gas in order to avoid any yellow tip at the top of the flame. This flame is axially disposed under the lower end of the specimen for a period of 10 seconds. The burner is then removed and the time for self-extinguishment measured. Immediately after extinction, the flame is again axially disposed under the specimen for an additional 10 seconds. The burner is then removed and the self-extinguishing time measured. The data given in the examples are the average of 40 tests (20 specimens and 2 determinations of self-extinguishing times for each specimen).

The anti-static action was estimated by the degree of dust on plates prepared from the polymeric compositions, said plates being vertically disposed on a frame and exposed to the dust of a room during periods of time varying from 1 day to 1 month. The following value scale was used:
- 0 : plate entirely dust covered
- 1 : plate with many stria of dust
- 2 : plate with a few stria of dust
- 3 : plate without stria of dust In the following examples, the percentages are by weight based on the weight of polystyrenic resin.

EXAMPLE 1

Compositions were prepared from a high-impact polystyrene, 10% of deca-bromobiphenyl and various amounts of antimony oxide. Lauric acid diethanolamide (LDE) was also added to some of these compositions in an amount corresponding to 2% by weight of polystyrene. The results were as follows:

| Weight % of $Sb_2O_3$ | Self-extinguishing time (in seconds) | |
|---|---|---|
| | Without LDE | With LDE |
| 0 | 56 | 34 |
| 1 | 21.2 | 3.36 |
| 2 | 2.61 | 1.06 |
| 3 | 2.18 | 0.81 |
| 5 | 0.93 | 0.79 |

From the above results, it is believed apparent that LDE has a synergistic action with the fire retardant agent, even in the absence of $Sb_2O_3$, and that the synergistic action of $Sb_2O_3$ with the fire retardant agent is improved in the presence of LDE; the amount of $Sb_2O_3$ may be significantly decreased when LDE is added to the composition without detrimental effect on the self-extinguishing time.

Plates were prepared from the compositions containing LDE and were tested with regard to the anti-static properties. The results were as follows:

| Period of time | 1 day | 3 days | 1 month |
|---|---|---|---|
| Value | 3 | 3 | 3 |

By way of comparison, a similar composition was prepared but with the use of the sodium salt of lauryl sulfate as antistatic agent instead of LDE. Said composition contained 5% of $Sb_2O_3$. The self-extinguishing time was 26.3 seconds, instead of 0.93 for a composition without anti-static agent.

This comparative experiment illustrates that $Sb_2O_3$ has no synergistic action when used in admixture with an anti-static agent which does not belong to the group consisting of fatty amines, fatty amides or compounds containing an ammonium group.

EXAMPLE 2

Two compositions were prepared from high-impact polystyrene, 15% of perchloropentacyclododecane, 5% of $Sb_2O_3$ and, respectively, 0 and 2% of LDE. The self-extinguishing times were 2.35 seconds for the compositions without LDE and 1.62 seconds for the compositions containing LDE. The compositions containing LDE were anti-static, the value being 3 after a test period of 1 month.

EXAMPLE 3

Five polystyrenic compositions have been prepared from high-impact polystyrene, 10% of deca-bromodiphenyl, 3% of $Sb_2O_3$ and a nitrogen-containing compound which was in Composition A, 2% of lauric acid monoisopropanolamide, in Composition B, 2% of pelargonic acid triisopropanolamide, in Composition C, 1.5% of ethoxylated cetylamine (with 2 ethylene oxide groups) in Composition D, 1.5% of N-(3-dodecyloxy-2-hydroxypropyl)-ethanolamine, and in Composition E : 1.2% of (3 laurylamidopropyl)-trimethylammonium-methyl sulfate.

The Compositions A to E had the following self-extinguishing times:

| Composition | Time (in seconds) |
|---|---|
| A | 1.18 |
| B | 1.26 |
| C | 1.25 |
| D | 1.19 |
| E | 1.31 |

A similar composition but without the nitrogen-containing compound, had a self-extinguishing time of 2.18 seconds.

The values with regard to the anti-static properties of these compositions were as follows:

| Composition | After 1 day | After 3 days | After 1 month |
|---|---|---|---|
| A | 3 | 3 | 2 |
| B | 3 | 3 | 3 |
| C | 3 | 3 | 3 |
| D | 3 | 3 | 3 |
| E | 3 | 3 | 2 |

EXAMPLE 4

Two polystyrenic compositions were prepared from high-impact polystyrene, 10% of decabromodiphenylether, 3% of $Sb_2O_3$ and respectively, 0 and 2% of LDE.

| | 0 % LDE | 2 % LDE |
|---|---|---|
| Self-extinguishing time | 1.94 sec. | 0.89 sec. |

The composition containing 2% of LDE had a value of 3 after 1 month with regard to its anti-static properties.

What is claimed is:

1. A self-extinguishing polystyrenic composition, comprising:
   a. a polystyrenic polymer;
   b. a fire retardant amount of a halogenated organic fire-retardant agent selected from the group consisting of polyhalogenated biphenyls, polyhalogenated biphenylethers, perhalopentacyclododecane, and tris (2,3-dibromopropyl)phosphate; and
   c. an antistatic agent selected from the group consisting of lauric diethanolamide, ethoxylated cetylamine, pelargonic acid triisopropanolamide, lauric monoisopropanol amide, N-(3-dodecyloxy-2-hydroxypropyl)ethanolamine, and (3-laurylamidopropyl)-trimethylammonium methyl sulfate in an amount sufficient to enhance the self-extinguishing properties of said composition.

2. The composition of claim 1, wherein said halogenated organic fire-retardant agent is used in an amount between about 2 and 15 percent by weight of said polystyrenic polymer.

3. The composition of claim 1, wherein said antistatic agent is used in an amount between about 0.2% and about 8% by weight of said polystyrenic polymer.

4. The composition of claim 3, wherein said antistatic agent is used in an amount between about 1% and about 3% by weight of the polystyrenic polymer.

5. The composition of claim 1, further comprising antimony oxide.

6. The composition of claim 5, wherein said composition contains a maximum by weight of about 7% antimony oxide.

7. The composition of claim 6 wherein said composition contains between about 1% and about 4% by weight of antimony oxide.

8. The composition of claim 1, wherein said polystyrenic polymer is polystyrene.

9. The composition of claim 1, wherein said polystyrenic polymer is an acrylonitrile-butadiene-styrene polymer.

10. The composition of claim 1, wherein said polystyrenic polymer is a styrene-acrylonitrile copolymer.

11. The composition of claim 1, wherein said polystyrenic polymer is an elastomer-containing polystyrene polymer.

12. The composition of claim 1, wherein said antistatic agent is lauric diethanolamine.

13. The composition of claim 1, wherein said antistatic agent is ethoxylated cetylamine.

14. The composition of claim 1, wherein said antistatic agent is pelargonic acid triisopropanolamide.

15. The composition of claim 1, wherein said antistatic agent is lauric monoisopropanolamide.

16. The composition of claim 1, wherein said antistatic agent is N-(3-dodecyloxy-2-hydroxypropyl) ethanolamine.

17. The composition of claim 1, wherein said antistatic agent is (3-laurylamidopropyl)-trimethyl ammonium-methyl sulfate.

18. The composition of claim 1, wherein said fire-retardant agent is decabromodiphenyl.

19. The composition of claim 1, wherein said fire-retardant agent is perchloropentacyclododecane.

20. The composition of claim 1, wherein the fire-retardant agent is tris(2,3-dibromopropyl)phosphate.

21. The composition of claim 1, wherein the fire-retardant agent is decabromodiphenylether.

* * * * *